United States Patent [19]

Breikss

[11] 3,789,379

[45] Jan. 29, 1974

[54] COMPENSATION OF REPRODUCED SIGNAL BY MEASURING A DEVIATION OF RECORDED REFERENCE SIGNAL

[75] Inventor: Ivars Peter Breikss, Littleton, Colo.

[73] Assignee: Honeywell Inc., Minneapolis, Minn.

[22] Filed: Feb. 23, 1973

[21] Appl. No.: 335,307

[52] U.S. Cl. .......................................... 340/174.1 H
[51] Int. Cl. .......................................... G11b 5/44
[58] Field of Search ............. 340/174.1 B, 174.1 H; 179/100.2 S

[56] References Cited

UNITED STATES PATENTS

| | | | |
|---|---|---|---|
| 3,731,220 | 5/1973 | Besonfelder | 340/174.1 H |
| 3,699,554 | 10/1972 | Jones | 340/174.1 H |
| 3,181,133 | 4/1965 | Seitner | 340/174.1 H |
| 3,660,821 | 5/1972 | Weber et al. | 340/174.1 H |
| 3,497,632 | 2/1970 | Eisenstadt | 340/174.1 H |
| 3,488,452 | 1/1970 | Gunning et al. | 340/174.1 H |

*Primary Examiner*—Vincent P. Canney
*Attorney, Agent, or Firm*—Arthur H. Swanson; Lockwood D. Burton; Mitchell J. Halista

[57] ABSTRACT

A playback circuit has a first frequency modulated discriminator for discriminating a reference signal reproduced from a recording medium and a second frequency modulated discriminator for discriminating a data signal reproduced from the same recording medium as the reference signal. A shift register storage means is arranged to store the reproduced data signals and to apply them to the second discriminator at a rate determined by a clock signal produced by a voltage controlled oscillator driven by an output signal from the first discriminator.

6 Claims, 3 Drawing Figures

COMPENSATION OF REPRODUCED SIGNAL BY MEASURING A DEVIATION OF RECORDED REFERENCE SIGNAL

The present invention relates to magnetic tape playback systems. More specifically, the present invention is directed to a circuit for compensating for the effect of tape flutter in the playback signal.

An object of the present invention is to provide an improved tape flutter compensating circuit for a magnetic tape playback system.

SUMMARY OF THE INVENTION

In accomplishing this and other objects, there has been provided, in accordance with the present invention, a playback system using a data track and a reference track for producing a playback data signal and a playback reference signal, respectively. The data track signal is applied to the input of a shift register and is shifted therein by a clock drive signal derived from the reference signals reproduced from the reference track. The time of storage in the shift register is varied by the clock signals obtained from the reproduced reference clock signals in opposite phase to the time base error produced by the data track carrier and by an amount proportional to the size of the error.

BRIEF DESCRIPTION OF THE DRAWINGS

A better understanding of the present invention may be had when the following detailed description is read in connection with the accompanying drawings in which.

DETAILED DESCRIPTION

Figures 1, 2:
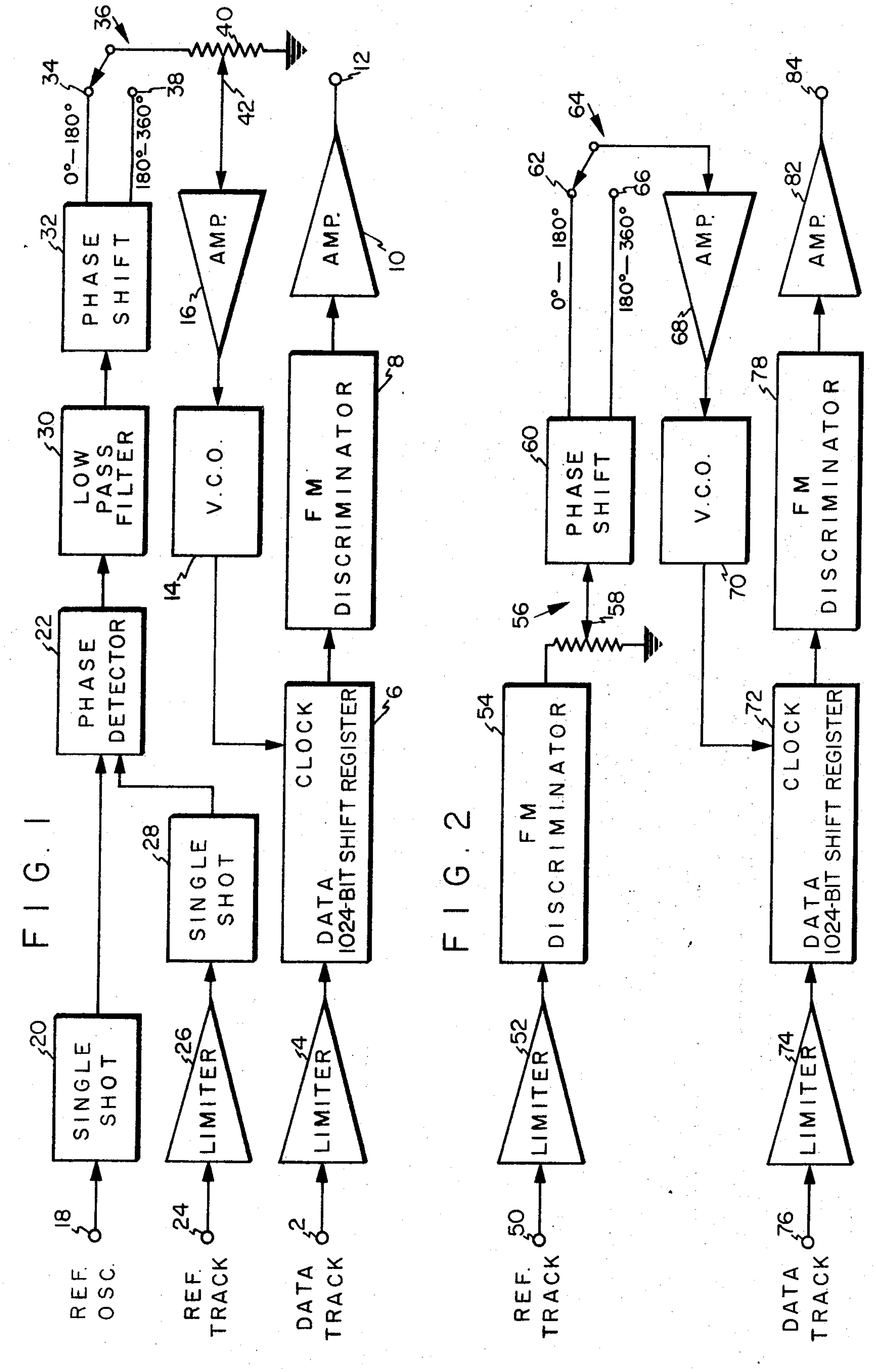
FIG. 1 is a block diagram of a playback compensating circuit embodying the present invention.
FIG. 2 is another embodiment of the present invention in a playback compensating circuit.

Referring to FIG. 1 in more detail, there is shown a playback compensating circuit having a first input terminal 2 arranged to be connected to a recording/reproducing circuit (not shown) suitable for reproducing the data stored on a data track of a magnetic record. The data track input terminal 2 is connected to the input circuit of a limiter circuit 4. The output circuit of the limiter circuit 4 is connected to the input circuit of a shift register 6 having a fixed bit storage capacity, e.g., 1,024 bits. An output signal from the shift register 6 is applied to a frequency modulated, of FM, discriminator 8 having an output circuit connected through an amplifier 10 to an output terminal 12. The FM discriminator used in the present invention may be a circuit as shown in U.S. Pat. No. 3,548,328 which is assigned to the same assignee as the present invention. A clock signal for the shift register 6 is obtained from a voltage controlled oscillator 14 controlled by the output signal from a buffer amplifier 16. The input signal to the buffer amplifier 16 is obtained from a phase detector circuit 22 used to compare the output signals from a reference oscillator and a reference track recorded adjacent to the data track and to produce an output signal proportional to the difference therebetween, such circuits being well-know in the art.

A second input terminal 18 is connected to the input circuit of a single shot, or astable multivibrator, 20 having its output circuit connected to one input circuit of the phase detector circuit 22. A third input terminal 24 arranged to be connected to a reproducing means (not shown) for reproducing a reference signal from a reference track on the aforesaid recording medium is connected to the input circuit of a limiter 26. An output circuit of the limiter 26 is connected to the input circuit of a single shot 28 used to apply an input signal to a second input circuit of the phase detector 22. The output signal from the phase detecter 22 is applied through a low pass filter 30 to the input circuit of a variable phase shift circuit 32. The phase shift circuit 32 may be any suitable circuit which is arranged to have two output circuits having phase shift capabilities variable from 0° to 180° and from 180° to 360°, respectively, such circuits being well-known in the art, e.g., a variable R-C network. A first output circuit from the phase shift circuit 32 is connected to a first terminal 34 of a single-pole, double-throw switch 36. A second output circuit from the phase shift circuit 32 is connected to a second terminal 38 of the switch 36. The output from the switch 36 is connected through a potentiometer resistor 40 to a common ground return. A sliding contact 42 on the potentiometer resistor 40 is connected to the input circuit of the buffer amplifier 16 to supply a control signal for the voltage controlled oscillator 14, as previously discussed.

In FIG. 2, there is shown a block diagram of a playback compensating circuit using another embodiment of the present invention. A first input terminal 50 is connected to a means (not shown) for reproducing a signal from a reference track on a recording medium. The first input terminal 50 is connected to the input circuit of a limiter 52 having its output circuit connected to the input circuit of a first FM discriminator 54. The output circuit from the first FM discriminator 54 is applied to a potentiometer 56 having a moveable slider 58 connected to the input circuit of a phase shift circuit 60 similar to the phase shift circuit 32 discussed above with respect to FIG. 1. A first output circuit of the phase shift circuit 60 is connected to a first terminal 62 of a single-pole, double-throw switch 64. A second output circuit of the phase shift circuit 60 is connected to a second terminal 66 of the switch 64. An output terminal of the switch 64 is connected to an input circuit of a buffer amplifier 68 having an output circuit connected to an input circuit of a voltage controlled oscillator 70. The output signal from the voltage controlled oscillator 70 is connected to a clock input circuit of a shift register 72 similar to the shift register 6 shown in FIG. 1. A data input circuit for the shift register 72 is connected to an output circuit of a limiter 74. An input signal for the limiter 74 is supplied from a second input terminal 76 which is arranged to be connected to a means (not shown) for reproducing a recorded signal in a data track on the recording medium storing the aforesaid reference track. An output signal from the shift register 72 is applied to an input circuit of a second FM discriminator 78. An output signal from the second FM discriminator 78 is applied through an amplifier 82 an output terminal 84.

MODE OF OPERATION

In operation, the circuits shown in FIGS. 1 and 2 are effective to compensate an error known as the "time base error" in a recording playback signal which is defined as an error produced during the reproduction of a recorded signal having a variable repetition rate, i.e., frequency modulated. This error manifests itself as low frequency sidebands around each discrete frequency signal recorded on the recording medium. In the case of a reproduced sinusoidal signal, for example, the zero crossings of the sine wave would have an error from one cycle to the next. This distortion of the reproduction of the previously recorded signals are generally attributable to an imperfect linear motion of the tape during the recording as well as the reproducing process. In many applications, the sidebands caused by time base errors are indistinguishable from real data and in this way severely limit the applications of tape recorders. Conventional reduction of time base errors by improving the mechanical design of the tape transport and/or improving recorder manufacturing techniques are extremely expensive and are ultimately effective to produce an uneconomical tape recording and playback system. The present system, which is specifically directed for use with signals recorded in the frequency modulated, or FM, format as generally used in digital signal recording, is arranged to compensate for the time base errors in the playback circuitry without resorting to uneconomical mechanical redesign of the recording system. In the playback system disclosed herein, a reference track is recorded on the recording medium adjacent to the data track. The recording on the reference track is an unmodulated signal of a predetermined frequency which is reproduced by a reference track playback circuit and is applied to a means for detecting errors in the playback signal from the reference track recording, i.e., time base errors in the reference track playback signal. The reference signal recording track is located physically as close as possible to the data recording track whereby time base errors of the playback signal from the data recording track are mirrored in the time base errors of the signals reproduced from the reference track. In some applications, it may be desirable to multiplex the reference signal onto the data track to combine the data and the reference signals in order to assure that the time base errors of the two reproduced signals are identical.

Figure 3:
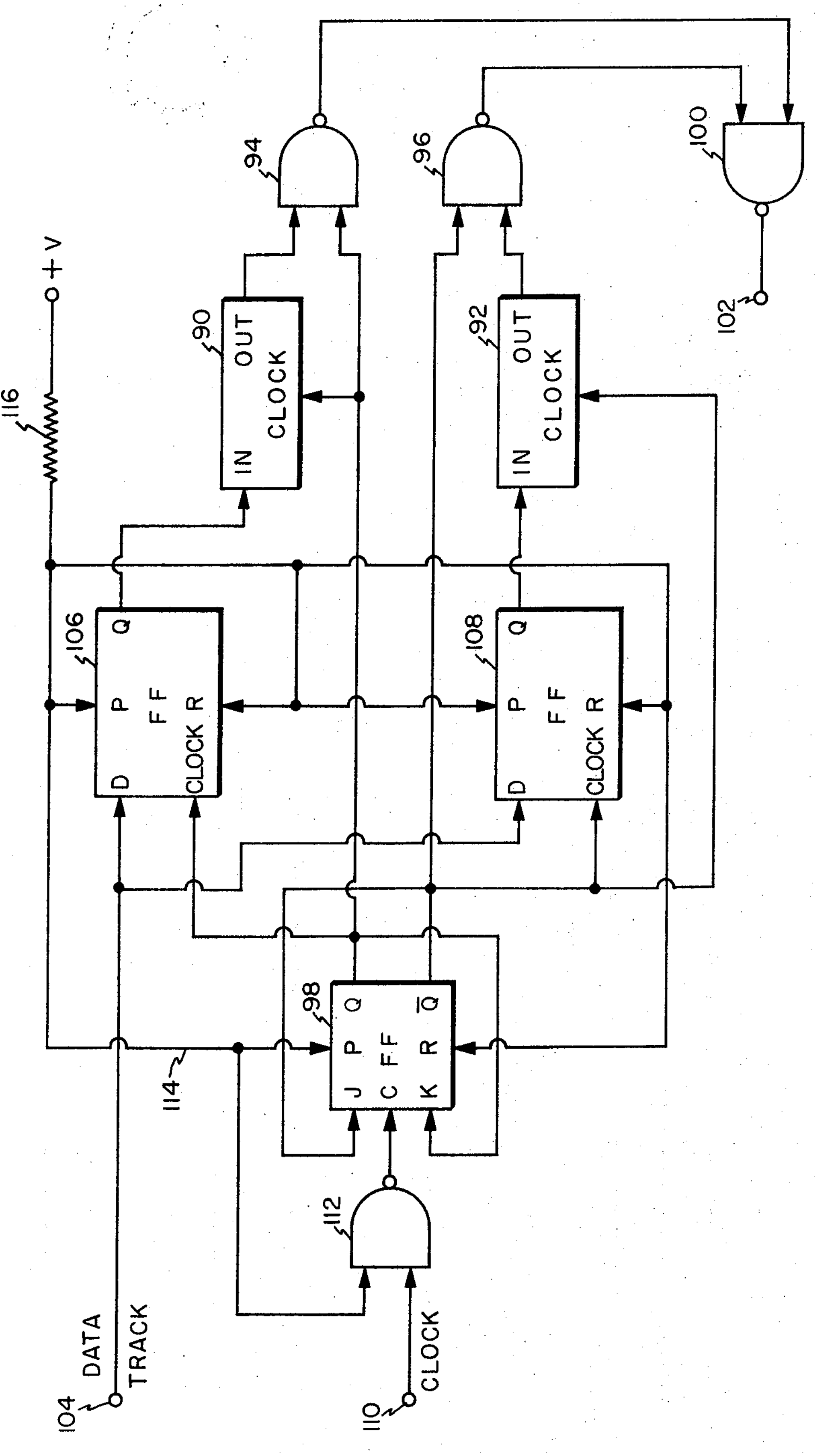
FIG. 3 is a block diagram of a shift register circuit suitable for use with either of the embodiments of the present invention shown in FIGS. 1 and 2.

Referring initially to the playback system shown in FIG. 2, the output signal from the reference track is applied to a first FM discriminator 54 to produce an output signal representative of the frequency variations of the reproduced signal from the reference track around the center frequency represented by the unmodulated reference signal, which frequency is also the center frequency of the first discriminator 54. Since the time base errors in the reproduced signal would produce variations in the zero crossing of the reference signal, these variations would be interpreted by the discriminator 54 as variations in frequency of the reference frequency and accordingly, the output signal from the discriminator 54 would be proportional to the time base errors of the reproduced reference signal. The potentiometer 56, the phase shift circuit 60 and the switch means 64 are used to select the proper amplitude and phase of the output signal from the discriminator 54 for application to the voltage controlled oscillator, VCO, 70. The output signal from the voltage controlled oscillator 70 is used to provide a clock signal for the shift register circuit 72 which circuit is used to store the reproduced data signal from the data track. A suitable circuit for use as the shift register 78 is shown in FIG. 3 and is described hereinafter. Thus, the reproduced data track signal applied to the second input terminal 76 is converted to a square wave by the limiter circuit 74 which square wave represents the frequency modulated carrier of the data recording and the unmodulated carrier frequency is the center frequency of the second discriminator 78. The square wave data signal is applied to the input circuit of the shift register circuit 72 wherein the total time of storage is proportional to the number of storage bits in the register divided by the frequency of the clock supplied to the clock input of the shift register circuit 72. The data signal is delayed, i.e., stored, in the shift register 72, while the storage time of the data signal is varied by a variation in the output frequency from the voltage controlled oscillator 70.

In order to achieve the time base error correction in the shift register circuit 72 this storage time must be varied in opposite phase to the time base errors of the data track signal and to an extent proportional to the size of the error. In other words, the zero crossing error may be on either side of the correct crossing location and may be variable in the extent of the deviation from the correct location. In order to correct for the direction of the time base error, the storage time is varied to either decrease or increase the storage time while the extent of the deviation, or error, is compensated by the amount of the change in the storage time. Thus, as the reproduced reference track signal produces an output from the first discriminator 54 indicative of a frequency change caused by a time base error, this signal is ultimately applied to the voltage controlled oscillator 70 to produce an output signal capable of changing the storage time in the shift register 72 to produce an output signal from the shift register 72 having a zero crossing which is corrected for the time base errors. Accordingly, in the case of an unmodulated data track signal the output from the shift register 72 is adjusted by the phase shift means 60 and the potentiometer 56 to produce an output from the second discriminator 78 representative of the center frequency of the discriminator 78 wherein the output signal on the output terminal 84 would be indicative of a lack of variation in the unmodulated data frequency. Since the storage time in the shift register is proportional to the change in the output frequency from the voltage controlled oscillator 70, the storage time in the shift register 72 can be varied as finely as the variation in the frequency from the voltage controlled oscillator 70.

The compensating circuit shown in FIG. 1 is a modification of the system described above with respect to FIG. 2 wherein the changes consist mainly of the elimination of the first discriminator 54 and a replacement thereof by a fixed frequency reference source, i.e., a crystal-controlled oscillator and a phase detector 22. Additionally, a pair of single-shot circuits 20 and 28 are provided for standardizing the signals from the reference oscillator and the reference track before applying these signals to be compared by the phase detector 22. The output signal from the phase detector 22 is representative of the phase difference between the fixed frequency reference signal and the reproduced signal from the reference track on the recording medium. This output signal is passed through a low-pass filter to eliminate any undesired signals and is ultimately applied to a phase shift circuit 32 similar to the phase shift circuit 60 shown in FIG. 2. The rest of the operation of the circuit shown in FIG. 1 is similar to that described above with respect to FIG. 2 to produce a time base error correction of the signals reproduced from the data track as applied to the first input terminal 2.

In FIG. 3, there is shown a block diagram of a shift register circuit suitable for use as the shift register circuit used in a system shown in FIGS. 1 and 2. This shift register circuit uses a pair of shift register 90 and 92 which are devices well known in the art. The shift registers 90 and 92 are each 1024 bit shift registers. An output circuit from the first shift register 90 is connected to a first input of a first two-input NAND gate 94 while the output circuit of the second shift register 92 is connected to the first input of a second two-input NAND gate 96. The second inputs for the NAND gates 94 and 96 are obtained from a first J-K flip-flop 98 as hereinafter described. The output signals from the NAND gates 94 and 96 are applied to respective input of a third two-input NAND gate 100. The output from the third NAND gate 100 is applied to an output terminal 102 which is the output terminal from the shift register circuit and is connected to the output digital FM discriminator used in the circuits shown in FIGS. 1 and 2.

An input terminal for the shift register circuit shown in FIG. 3 which is arranged to be connected to the source of data signals is labeled data track input terminal 104 and is connected to the D, or data, input of a pair of data flip-flops 106 and 108. The logical 1 output from the first data flip-flop 106 is connected to the input circuit of the first shift register 90 while the logical 1 output of the second flip-flop 108 is connected to the input circuit of the second shift register 92. A clock input terminal 110 is provided for connection to the voltage controlled oscillator shown in the circuits of FIGS. 1 and 2 and is connected to a first input of a fourth two-input NAND gate 112. The output from the fourth NAND gate 112 is connected to the complimenting, or toggle, input of the J-K flip-flop 98. A second input for the fourth NAND gate 112 is obtained from a supply line 114 connected through a resistor 116 to a source labeled +V. The line 114 is also connected to the reset and preset terminals of the J-K flip-flop 98 and the first and second data flip-flops 106 and 108 to isolate these terminals thereof from the effect of stray signals.

The output terminals of the J-K flip-flop 98 are cross coupled, i.e., the logical 1 output is connected to the K input circuit while the logical 0 output is connected to the J input circuit to permit the toggling of this flip-flop by the output from the fourth NAND gate 112. Concurrently, the outputs from the J-K flip-flop 98 are used as clock and enabling signals for the data flip-flops 106 and 108, the shift registers 90 and 92 and the first and second NAND gates 94 and 96. Specifically, the logical 1 output from the flip-flop 98 is connected to the clock input circuit of the first data flip-flop 106 and the clock input circuit of the first shift register 90 and is applied as a second input signal to the first NAND gate 94. Concurrently, the logical 0 output circuit from the flip-flop 98 is connected to the clock input circuit of the second data flip-flop 108 and the clock input circuit of the second shift register 92 and is applied as a second input signal to the second NAND gate 96. The circuit shown in FIG. 3 is used to store the data track signals and to shift them out at a rate determined by the clock input signal. The operation of the circuit shown in FIG. 3 is well-know and the details of the circuit are presented here only for purposes of illustration in order to complete the disclosure of the compensating circuit of the present invention. Briefly, the data signals are alternately stored in a pair of shift registers 90 and 92 by the toggling of the J-K flip-flop 98 by the clock signals. The use of the two shift registers 90 and 92 enables the circuit to function overall at a frequency twice that of either of the shift registers 90 and 92. Thus, the shift rate of the shift register circuit is controlled by the frequency of the voltage control oscillator shown in FIGS. 1 and 2 and is effective to produce a compensation in the zero crossing of the output signal applied to the digital FM discriminator connected to the output of the shift register circuit, as previously discussed.

Accordingly, it may be seen that there has been proved in accordance with the present invention, a playback system for compensating a reproduced signal to offset the effects of flutter of the recording medium.

The embodiments of an invention in which an exclusive property or privilege is claimed is defined as follows:

1. A playback system comprising
reference signal input means arranged to be connected to a source of reference signals,
first comparing means connected to said reference input signal means for producing an output signal indicative of a variation of the reference signal from a predetermined standard,
voltage controlled oscillator means having an input circuit connected to receive said output signal from said comparing means to produce an output signal having a frequency representative of said output signal from said comparing means,
data input signal means arranged to be connected to a source of data signals having a variable repetition rate,
signal storing means having an input circuit connected to said data input means and an output circuit and arranged to store a predetermined number of data signals and to transfer the stored data signals out of said storing means to said output circuit in response to a clock signal,
circuit means for applying an output signal from said voltage controlled oscillator as a clock signal to said storing means,
output terminal means, and second comparing means having an input circuit connected to said output circuit of said storing means and an output circuit connected to said output terminal means and arranged to produce an output signal for applying to said output terminal means representative of the repetition rate of the data signals.

2. A playback system as set forth in claim 1 wherein said data signals are frequency modulated signals and said second means for comparing includes a frequency modulated discriminator arranged to discriminate the data signals from said storage means.

3. A playback system as set forth in claim 1 wherein said first comparing means includes a phase detector for comparing a pair of input signals applied thereto and producing an output signal representative of the difference in phase of the compared input signals,
a fixed frequency reference oscillator means, first circuit means arranged to connect an output signal from said reference oscillator means as a first input signal to said phase detector means and second circuit means arranged to connect said reference signal input terminal to a second input circuit of said phase detector means to apply a second input signal to said phase detector means.

4. A playback system as set forth in claim 1 wherein said means for comparing includes means for adjusting the phase and amplitude of an output signal from said means for comparing.

5. A playback system as set forth in claim 2 wherein said first comparing means includes a frequency modulated discriminator arranged to discriminate the reference signals from said reference signal input means.

6. A playback system as set forth in claim 5 wherein said storing means is a shift register.

* * * * *